United States Patent [19]

Buchanan et al.

[11] 4,196,474

[45] Apr. 1, 1980

[54] INFORMATION DISPLAY METHOD AND APPARATUS FOR AIR TRAFFIC CONTROL

[75] Inventors: William E. Buchanan, Columbia; Eugene F. Kiley, Bowie, both of Md.

[73] Assignee: The Johns Hopkins University, Baltimore, Md.

[21] Appl. No.: 440,974

[22] Filed: Feb. 11, 1974

[51] Int. Cl.² ........................ G06F 15/48; G08G 5/00
[52] U.S. Cl. .................................... 364/461; 364/441; 364/440
[58] Field of Search ........... 235/150.2, 150.23, 150.26, 235/150.27; 343/112 C, 112 CA, 50 P, 9, 10, 225; 340/22, 23, 26, 27, 32, 33; 364/461, 458, 439, 440, 441

[56] References Cited

U.S. PATENT DOCUMENTS

| | | | |
|---|---|---|---|
| 3,310,806 | 3/1967 | Stansbury | 235/150.23 X |
| 3,614,728 | 10/1971 | Borrok et al. | 343/112 CA X |
| 3,623,090 | 11/1971 | Gilbert et al. | 343/112 CA X |
| 3,668,403 | 6/1972 | Meilander | 343/112 CA X |
| 3,737,902 | 6/1973 | O'Hagan et al. | 343/112 CA X |
| 3,766,552 | 10/1973 | Hajduk | 343/112 CA X |
| 3,803,602 | 7/1972 | Case et al. | 343/112 CA X |
| 3,808,598 | 4/1974 | Carter | 343/112 CA X |

*Primary Examiner*—Edward J. Wise

*Attorney, Agent, or Firm*—Robert E. Archibald

[57] ABSTRACT

The invention relates to a method and apparatus for providing pilots of aircraft or the like with: information about the presence, identification and relative location of, and time to potential collision with, other aircraft, objects, and obstructions, i.e. pilot warning indicator (PWI); instructions enabling pilots to avoid collisions, i.e. a collision avoidance system (CAS); and, advisory messages such as altitude and heading changes. The information, instructions and messages are organized, in accordance with the invention, through the use of a novel program subroutine in a general-purpose digital computer serving as a central communications computer or a specially programmed computer dedicated to controlling the encoding and transmission of digital air traffic control messages to pilot and/or controller information display terminals. At such terminals, the received digital messages are converted into a format suitable for decoding; are decoded by digital logic switching circuitry; and, the information contained therein is displayed to the pilot or controller by a novel and versatile display apparatus incorporating color-coding and lighted characters and providing a very effective display of all critical information regarding potential collisions and how to avoid them, as well as other advisory messages.

17 Claims, 14 Drawing Figures

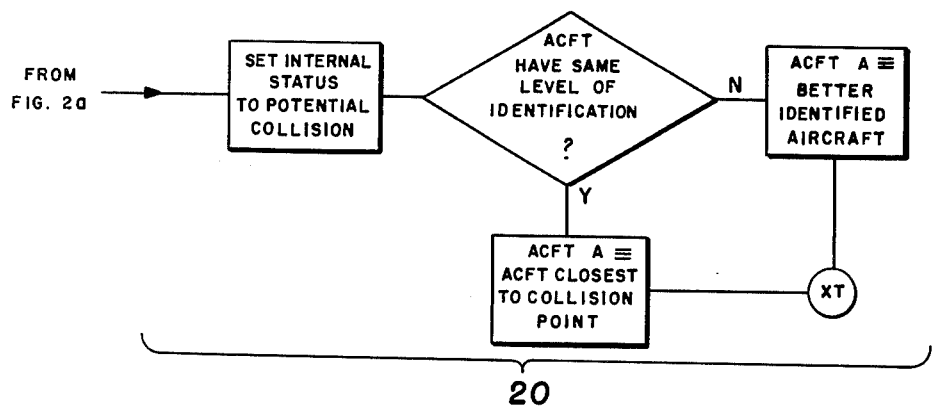
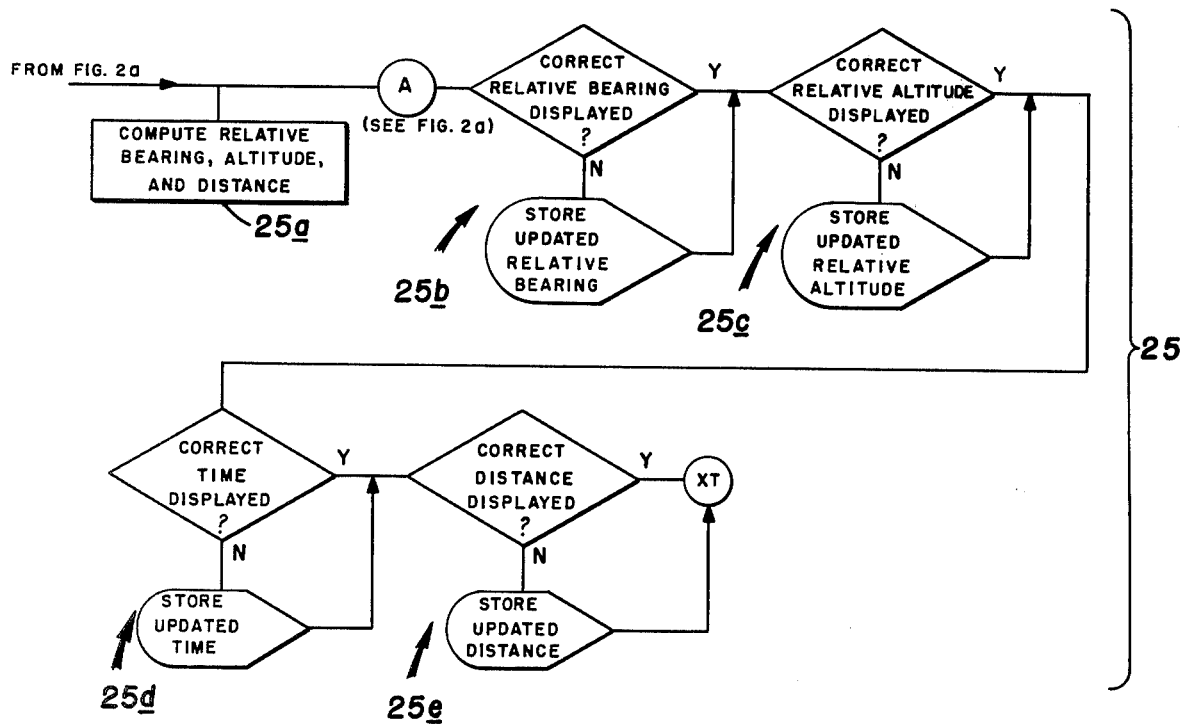
FIG. 2b

TYPICAL DATA UNIT = 9 BITS

BITS 1-5 AND 7 = ADDRESSES 0 TO 63

BIT  6 = 1 = ON

BIT  9 = 1 = OFF

BIT  8 = PARITY

IF BIT 6 = BIT 9 = 1, THEN THE NEXT 9 BITS ARE:

BITS 1-5 AND 7 = ASCII CODE FOR ACTUATING ALPHANUMERIC (A/N) DISPLAY COMPONENTS

IF BITS 1-5 AND 7 ARE ALL EQUAL TO 0, THEN TURN OFF DISPLAY LIGHTS

IF BITS 1-5 AND 7 ARE ALL EQUAL TO 1, THEN ENABLE DISPLAY

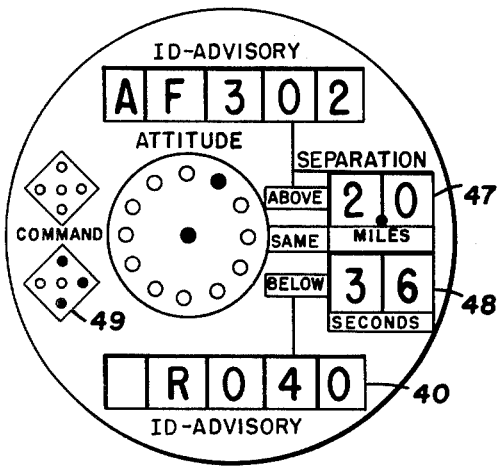
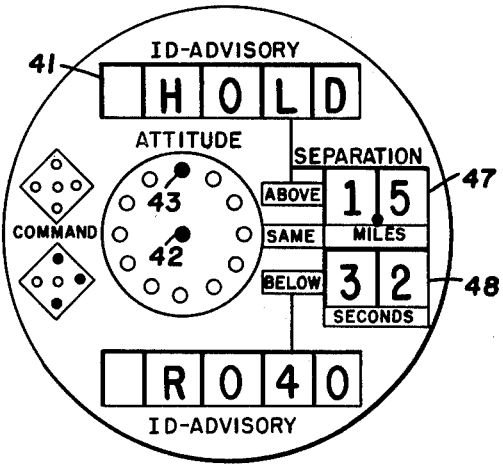
FIG. 9　　　　　　FIG. 10
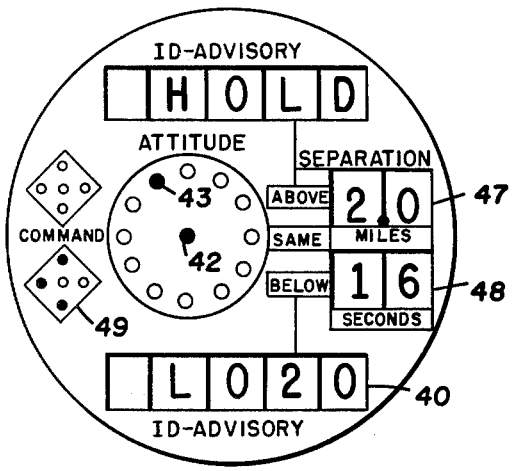
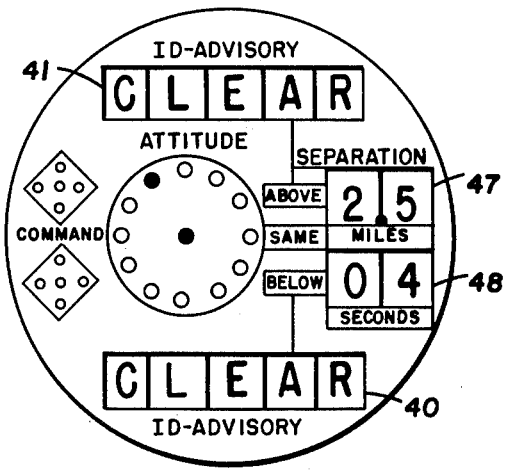
FIG. 11　　　　　　FIG. 12

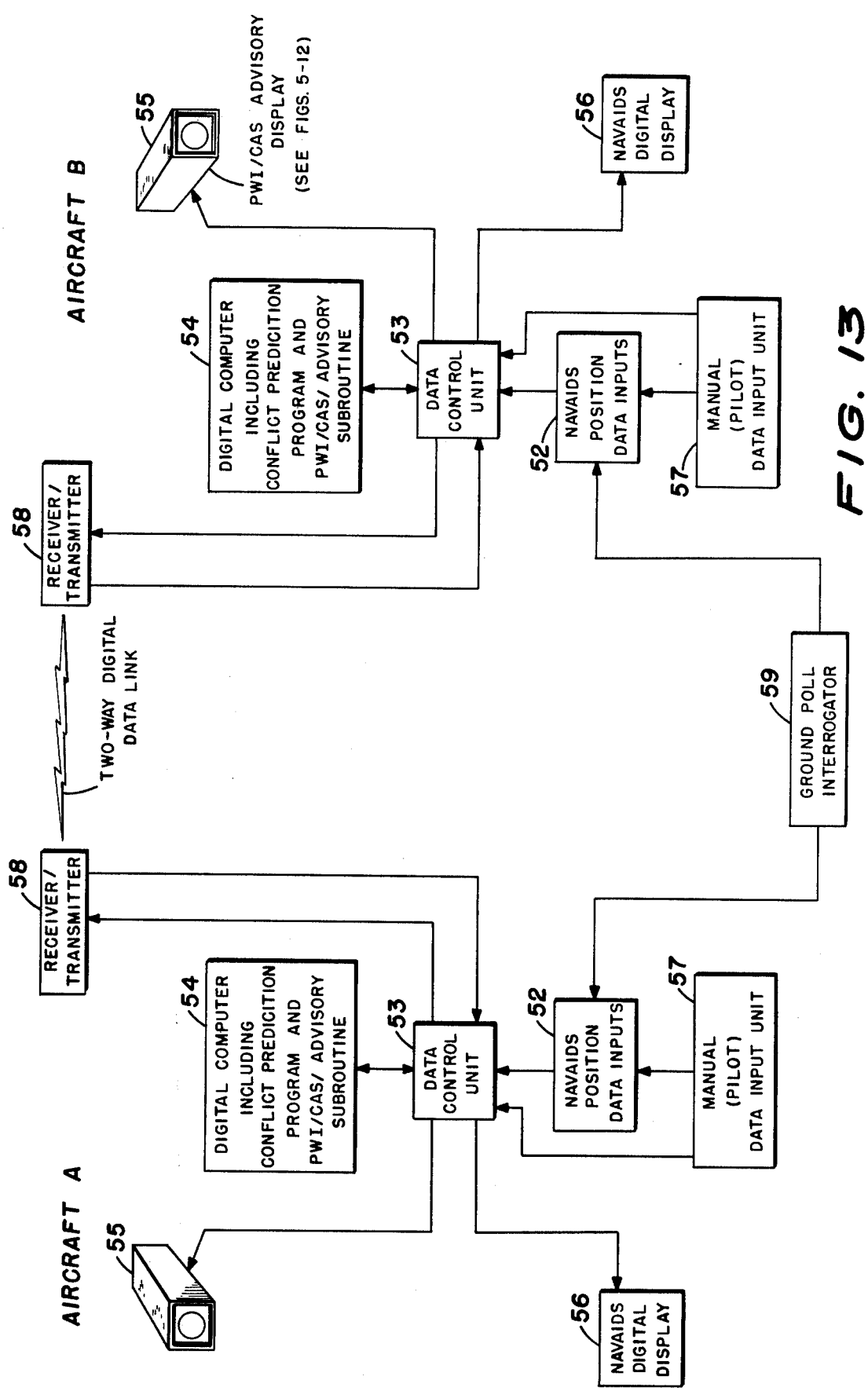

INFORMATION DISPLAY METHOD AND APPARATUS FOR AIR TRAFFIC CONTROL

STATEMENT OF GOVERNMENT INTEREST

The invention herein described was made in the course of or under a contract or subcontract thereunder with the Department of the Navy.

BACKGROUND OF THE INVENTION

Air traffic control systems are designed to provide pilots and controllers with information that enables them to cooperate in keeping aircraft on safe courses and in optimizing takeoff and landing schedules, thus effectively utilizing available airport capacity. Despite recent and continuing advances in ground radar methods of observing and determining the positions of aircraft, establishment of special area navigation routes and airport traffic zones that aid in the separation of controlled (instrument flight rule, IFR) traffic from uncontrolled (visual flight rule, VFR) traffic, and in computer assisted controller displays, a need remains for greater speed and reliability in communications between controllers and pilots, and in particular, an acceptable means of warning a pilot of an impending collision and informing him of steps to take to avoid near misses and improper separations while maintaining the integrity of the overall enroute and terminal traffic environments. At busy terminals, in particular, human controllers are near saturation in handling IFR traffic and during peak loads are unable to service VFR flights. The growth projected for privately owned small aircraft, nearly double in the next decade, promises a worsening of the existing condition. Segments of the airline industry, the Department of Transportation, National Aeronautics and Space Administration, and the Department of Defense are working together to improve the nation's existing air traffic control (ATC) so that the threat of midair collisions will be reduced.

There have been many previously proposed methods and apparatus for providing a pilot with a warning that another is in his vicinity. Several of these also provide instructions for a maneuver that he should make to avoid collision. Most of the present PWI/CAS systems are totally airborne devices; that is, they relay on a transmission (e.g. by radar, light, infrared) from one aircraft to another. The energy may be transmitted in one or more directions in space and reflected off another aircraft or, in the case of light, seen or sensed by an aircraft. When only one aircraft need be equipped, for example when a radar or infrared beam is used to "seek" out the other aircraft, the PWI/CAS is referred to as a noncooperating system. When two or more, ideally all, aircraft must be equipped and measurements are dependent upon exchange of information or common use of an external signal, the systems are referred to as cooperating.

To date, for several reasons including undemonstrated technical feasibility, incompatibility with the existing ATC, unacceptable cost, false alarms, insufficient range or coverage, none of the existing or proposed PWI/CAS systems and devices has found a majority following among the would-be purchasers and users of PWI/CAS equipment in the United States or in other countries. Authorities are in general agreement that the cost of PWI/CAS to the owner of a small private aircraft must be kept low; less than $1000 and preferably about $500, before it can be expected that he would add it to his avionics equipment or before it would be reasonable to require that he do so. It appears highly unlikely that present airborne systems, either cooperative or uncooperative will be able to meet this cost objective. Moreover, such systems would typically provide, at best, limited information to the pilots of small VFR type aircraft. In the most highly developed systems currently under consideration (a cooperative device with precise timing features), the general aviation version of the equipment would provide input to airliners and other IFR aircraft equipped with expensive apparatus designed to calculate and display collision avoidance solutions upon which the larger, better-equipped aircraft would base evasive maneuvers. Unfortunately, such systems appear limited to providing a solution in terms of up-down and right-left maneuvers, or up-down and an allowable rate of climb or descent.

The need for not only a technically sound PWI/CAS but one that all aircraft can afford and benefit from is clearly seen in statistics showing the current and projected size of the general aviation fleet, the preponderance of accidents involving this class of aircraft, and the growing concentration of flights at major aviation centers such as New York City, Los Angeles, Chicago, and Washington, D.C. Safety officials are agreed that general aviation poses a major problem to the efficient and safe operation of commercial air services throughout the nation, and especially for the Northest Corridor region. Its high rate of involvement in midair collisions and 'near misses' also poses a real threat to the safety of densely settled communities. Of 119 midair collisions in 1968 at least one general aviation aircraft was involved in 118 of them. Moreover, general aviation is expected to become ever more prevalent, with a projected growth of 89% from 1969 to 1981, while the commercial fleet is expected to increase 40% during the same years. The actual numbers projected by the Department of Transportation are 235,000 general aviation and 3,800 commercial aviation aircraft by 1981.

For a pilot warning indicator and/or collision avoidance system to be effective, therefore, it is abundantly clear that it must be able to prevent and resolve conflicts between general aviation aircraft and between general aviation and other aircraft. Practically, it must be installed aboard a significant number of general aviation as well as commercial and military aircraft. General aviation aircraft typically are lighter and more maneuverable than the other two classes and, thus, given sufficient and timely information usually could most easily and effectively take action to avoid a collision or near miss.

Another fundamental aspect of any PWI/CAS is that it should be compatible with the existing sensors, computers, procedures, and the human controller methodology of the present air traffic control (ATC) system; and it should be capable of growth with the over-all system as the system proceeds to higher levels of automation.

A third fundamental is that the PWI/CAS equipment aboard all aircraft should provide each pilot with sufficient information so that he can apply his highest level of skill—his human decision-making intelligence—to the problem of resolving conflicts and maintaining separations prescribed by ATC doctrine. The pilot should be part of an over-all closed loop control system in which his reactions provide positive feedback to the ATC system rather than introducing nonlinearities or unforeseen new emergencies.

SUMMARY OF THE INVENTION

The novel features of the present invention overcome the previously noted deficiencies in the art of pilot warning and collision avoidance devices and systems and meet the fundamental needs just stated. More specifically, the improved ATC system of the present invention is capable of automatically conveying comprehensive real-time pilot warning indication (PWI), collision avoidance system (CAS), and other advisory or command information to pilots/controllers of aircraft or the like via existing communications links. In the illustrated embodiments of the present invention, the means for accomplishing this includes a novel digital computer program subroutine that organizes the information into coded binary message data units for transmission to and actuation of an information display terminal located in the aircraft. Apparatus at such terminal decodes the message data units to actuate real-time visual (and audio) display components warning of potential conflict situations and indicating maneuvers for avoiding or resolving conflicts.

In particular, the proposed computer subroutine organizes the PWI/CAS/advisory message information into display sequences that are practical and yet flexible, and at the display terminal the coded messages called for by the subroutine are of such a nature that when decoded sequentially in real time they control the display terminal components to provide a very complete and practical display to the pilot/controller. The computer subroutine is essentially independent of the digital message data unit coding format selected in that any conventional binary logic data units can be used and, moreover, the binary message sequences resulting from the subroutine logic can be encoded for transmission on available aviation VHF, UHF or microwave communications carriers by standard pulse or other modulation techniques. For example, the 1030 megH Air Traffic Control Radar Beacon System Frequency can be used.

The display terminal proposed in accordance with the present invention provides a comprehensive real-time PWI/CAS/advisory information display in an efficient, economical, clear, and flexible way, such that each aircraft obtains comprehensive identification, position description and advisory information relating both to itself and any other aircraft involved with it in a conflict situation, provided real-time three-dimensional position data on the aircraft involved are available at a central communications computer or in the aircraft. The display terminal thus provides, for example, discrete identification information, enabling each pilot to identify himself, through the display of his aircraft, flight, serial, or other code number in alphanumeric characters. The proposed display terminal is also designed to present color-coded information relating to one's own and the "other" aircraft and, in general, provides a dynamic 4-dimensional position information display of the aircraft involved in a PWI/CAS situation. For example, in the presently preferred embodiment bearing or azimuth is depicted by a center light of one color and a ring of lights of another color showing relative clock bearing of the "other" aircraft. Relative altitude also is shown by lights reading "above, same, and below". Time to potential collision (seconds) and range (miles) are represented by digital light characters, or arrays, and coded in a distinct third color to indicate that they apply to both aircraft. The three classes of information—"self," "other", "both of us" are clearly delineated by area arrangement of display components and by color coding. The capability of the display terminal to show advisory messages in the form of letters and numbers, words and even sentences is also contemplated, in accordance with the present invention, as a feature facilitating display of identification, advisory messages, and combined command and advisory messages, such as a direction or speed change and the amount of change indicated. Moreover, the proposed terminal display is provided under normal operating ambient light conditions with a cockpit instrument of standard dimensions; e.g. the display face of which measures 3¼" inside diameter.

The compatability of this invention with other elements of the existing and future air traffic control system is of great potential importance. Messages organized, sent, received, and displayed by the method and apparatus of this invention are essentially the same as those now handled by controllers and pilots through voice communications. What this invention adds is the capability of automatically providing information on conflicts, advisory messages, and commands to an increased number of aircraft with at least an order of magnitude increase in speed and with significant increases in data integrity, i.e. quality of the message formulation and reliability of its being received and understood. The increased information which is thereby made available to pilots and, thus, the increased responsibility that it allows to be given to cockpit, or distributed, management without relieving the controller of responsibility for, access to, and over-all command of the ATC system, is also significant. Since the computer subroutine can call for pilot, or proximity, warning indication well in advance of danger and since this indication includes identification and 4-D position information, in many cases, perhaps most, pilots will be able to sight the "other aircraft" visually or engage in a rule-of-the-road course change suggested by the situation description, and thus will be able to avoid a developing conflict before it reaches the collision avoidance phase. On the other hand if it does reach that phase he will continue to receive helpful position data as well as instructions. The invention can also obviously be employed in semiautomatic PWI/CAS/advisory message processing, i.e. computer message formulation, coding and decoding coupled with controller decision-making or message authorization.

The nature of the invention makes possible valuable self-test features of light component operability and novel system test procedures through automatically programmed test messages, test messages called for by the pilot or ground computer, and routine tests on the ground in conjunction with check-out of radar beacon transponder or other avionics equipment.

In light of the above, a general objective of the present invention is to provide an improved method and apparatus, including a programmed digital computer, capable of communicating pilot warning indication (PWI), collision avoidance system (CAS) and advisory information within an air traffic control environment or the like.

A further object of the invention is to provide an air traffic control method and apparatus wherein every pilot can be provided with proximity warning information, including sufficient notice of a conflict to make avoidance possible and other PWI essentials such as real-time data on azimuth, altitude, range, and range rate of the other aircraft;

A further object of the invention is to provide an air traffic control method and apparatus wherein the pilot is also provided with maneuver, advisory, or command instructions, to aid him in avoiding or resolving a conflict, for example in the form of a variable set of maneuvers or commands and advisories that can be displayed visually on the face of a cockpit instrument or controller information terminal;

A further object of the invention is to provide an air traffic control method and apparatus wherein the message format, data rate and data communications can be handled through modification of the existing Air Traffic Control Radar Beacon System, or through existing air-to-ground VHF communications systems or similar carriers with suitable digital data link characteristics.

A related object of this invention is that it be capable of direct adaptation or expansion to meet intermittent positive control functions of proposed improved beacon systems that may comprise part of the future ATC.

A further object of the invention is to provide an air traffic control method and apparatus wherein a single versatile terminal device, configured either as a cockpit or controller information display, possesses the capacity of unambiguously showing pilot warning, collision avoidance and advisory information, e.g. by a set of alphanumeric and other light devices visible under the full range of normal ambient light conditions.

A further object of the invention is to provide an air traffic control method and apparatus wherein the basic cockpit panel PWI/CAS/advisory information display terminal, although quite versatile, is inexpensive and can take the form of a standard aircraft instrument that can display automatic or semiautomatic (controller approved) standard ATC advisory messages, e.g. altitude and heading changes.

A further object of the invention is to provide an air traffic control method and apparatus wherein discrete information relative to a conflict situation is provided, whether the display message is generated aboard an aircraft; or transmitted to the aircraft as a general broadcast; or beamed in azimuth, or in range and azimuth to the aircraft.

Other objects, purposes and characteristic features of the present invention will in part be pointed out as the description progresses and in part be obvious from the accompanying drawings wherein:

FIG. 1 is a generalized block diagram of the third generation Air Traffic Control (ATC) system being introduced in the United States with the present invention combined therewith;

FIGS. 2a and 2b, when placed side-by-side with FIG. 2a on the left constitute a flow diagram of the program subroutine proposed in accordance with and forming part of the present invention that organizes the PWI/CAS/advisory information into the sequence of message data units for actuation of the information display terminal portion of the invention;

FIG. 3 diagrammatically illustrates a typical coded binary message data unit for actuating the display components in the sequence called for by the proposed computer subroutine, in accordance with the present invention;

FIGS. 6 through 12 illustrate the face of the proposed display unit during key stages of a representative warning and collision avoidance sequence, in accordance with the present invention; and FIG. 13 is a generalized block diagram of the invention, as designed to operate as a cooperative airborne PWI/CAS/advisory message information display system.

Figure 1:
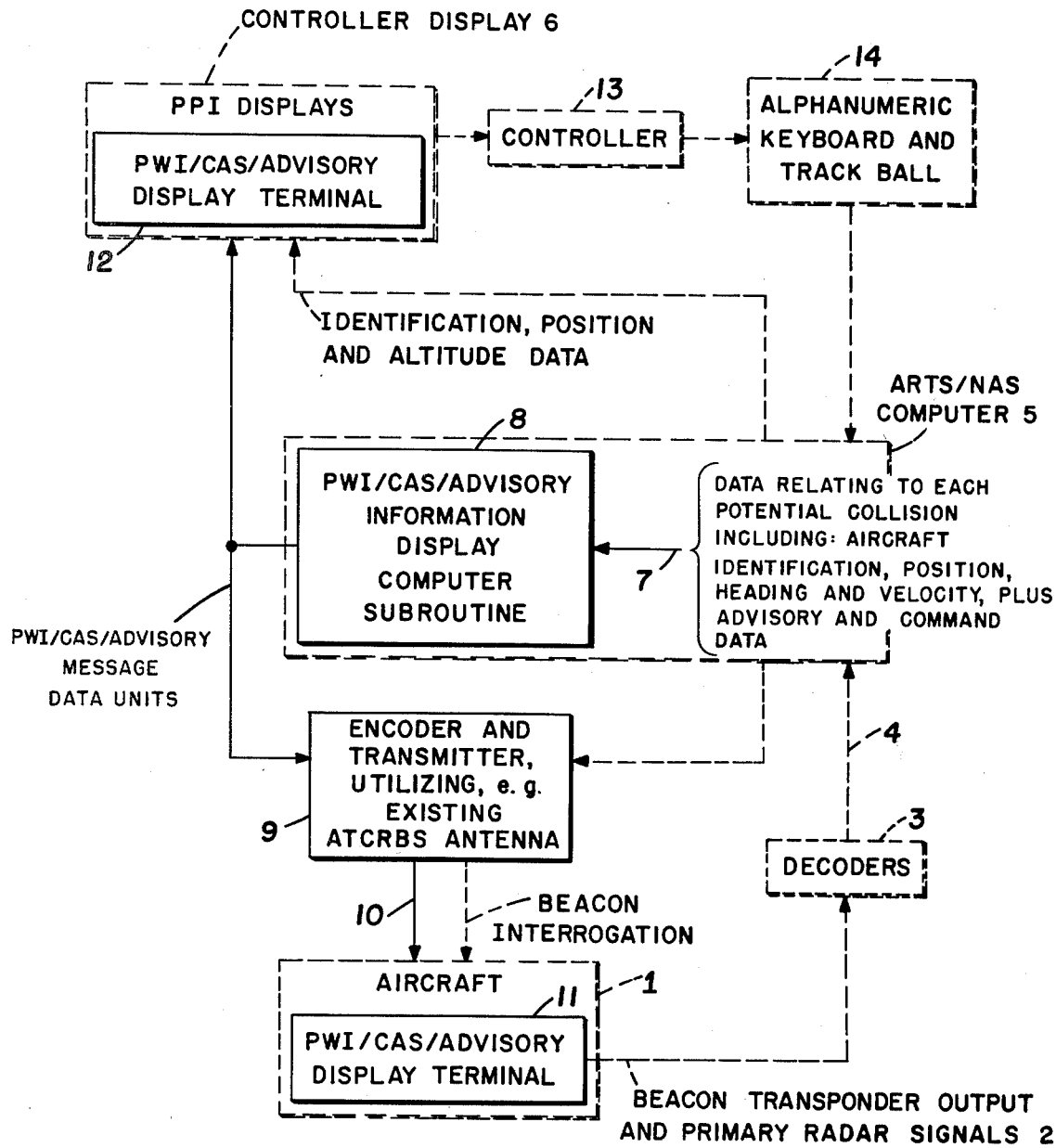

Referring now to FIG. 1, the proposed PWI/CAS/advisory information display system of the present invention is shown combined with the third generation ATC system, to thereby acquire and process aircraft position data and communicate PWI/CAS/advisory information to the aircraft and/or controllers. Elements of the PWI/CAS advisory information display system of the present invention are shown by solid lines; whereas, elements of the ATC as it is currently configured to provide and maintain position information on aircraft and assist controllers in maintaining prescribed separations of air traffic under their control are shown by dashed lines.

In the current ATC system, aircraft 1 are tracked by radar beacons and primary skin-tracking radars (not shown), as represented by the dashed line 2. The radar signal returns are decoded by well-known means 3 to yield aircraft range and azimuth information. In the case of beacon-transponder-equipped aircraft, automatic identification (Mode A beacon code) is also received; and a smaller number of aircraft also transpond altitude (Mode C) information, which is decoded along with identification, range, and azimuth data. This group of data (represented at 4 in FIG. 1) is fed to well-known general purposes computers such as represented at 5 and which are programmed, as is well-known, to maintain the track history of these targets and to present, to the controller(s), target position data in a real-time information display 6, on a plan position indicator (PPI) scope presentation where identification and altitude appear in black and white alphanumeric characters next to blips representing range and azimuth of aircraft under track.

It has been adequately demonstrated that the existing computer technology can provide automatic detection and prediction of conflicts both in en route air space and in terminal areas, and computers have been shown to have the ability to maintain current and projected tracks of the numbers of aircraft that are found in the air today and the larger numbers expected in the future. Algorithms to identify tracks that represent potential collision situations have been demonstrated, and data processing techniques to display such tracks in a PPI presentation are state of the art. By way of example and as is well-known in the art, ARTS-III employs modified Univac 1230 computers and the NAS-A en route data processing installations utilize IBM 9020 A, D or E machines. Regardless of the computer type employed, it is sufficient for the purposes of this disclosure that the conflict or collision data generated (designated at reference line 7) serve as PWI/CAS inputs to the PWI/CAS/advisory information system of the present invention, along with any pertinent advisory data selected by a controller.

As noted earlier, the particular manner in which conflict or collision data are generated and processed, in accordance with well-known conflict or collision prediction techniques, does not form part of the present invention except to the extent that it provides input data to the invention regarding potential collision situations. Without in any way intending to limit the scope of the present invention, such conflict or collision data could be provided, for example, by the conflict prediction algorithms disclosed in the U.S. patent to W. C. Meilander, U.S. Pat. No. 3,668,403, issued June 6, 1972 (see in particular FIG. 11 of this reference); whereas, the manner in which the raw positional data required for the detection of potential conflicts could be acquired and processed is described in detail, for example, in the report entitled "Expansion of The ARTS III System To The Radar Tracking Level ARTS IIIA", number RD-70-8, prepared for the FAA by UNIVAC under contract No. DOT FA69WA-2071. More particularly, as illustrated in the Central Track Store table (FIG. 84) on page 280 of report RD-70-8: Word 2 contains the X and Y coordinates; Word 4 contains time of data acquisition; Word 5 contains identification information, as an assigned beacon code and identification quality (NT); and Word 8 contains the Z coordinate.

As an alternative to the conflict prediction algorithms taught by Meilander, another usable conflict prediction technique is fully disclosed in the article "A Statistical Evaluation Of Aircraft Collision-Hazard Warning System Techniques In the Terminal Area" by C. L. Britt, Jr. and J. H. Schrader, IEEE Transactions, Aerospace and Electronic Systems, Volume AES-6, pages 10 through 21, January 1970.

Figure 2A:
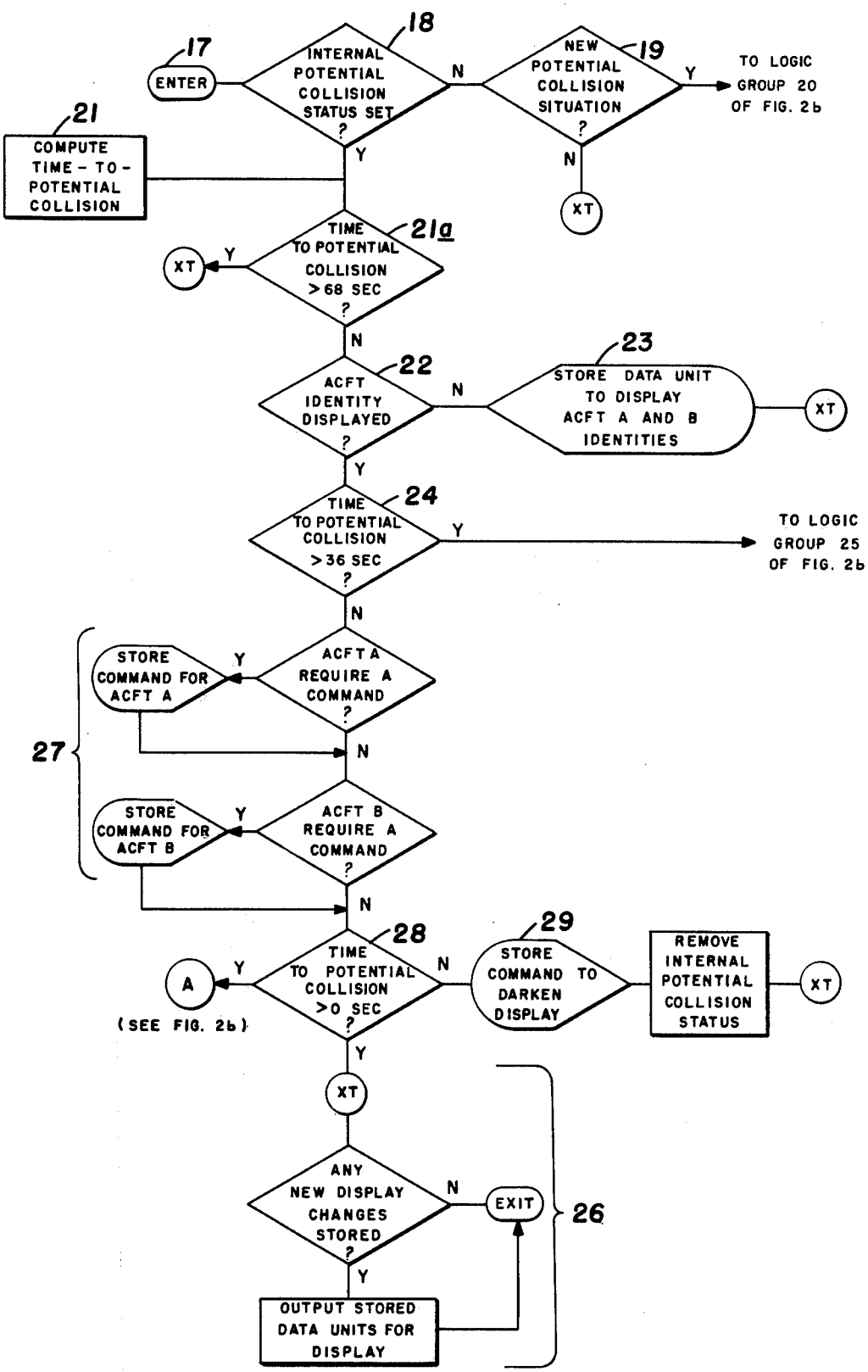
Figure 3:
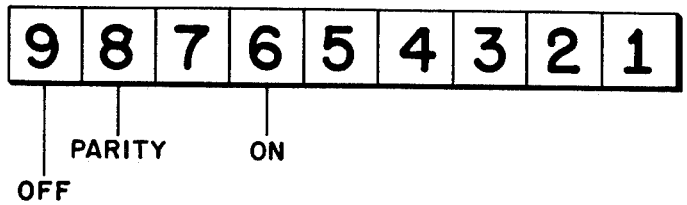

More particularly, the PWI/CAS/advisory information display computer subroutine represented at block 8 and illustrated in detail in FIGS. 2a and 2b, organizes the PWI/CAS/advisory information for encoding and transmission at 9, via digital data link 10, to an information display terminal 11 in aircraft 1 and/or to a controller information display terminal 12 which can be substantially similar to the cockpit terminal or could present the same information in a different format (e.g. conflicts could be tabulated rather than presented individually). As illustrated in FIG. 1, the PWI/CAS/advisory information display method and apparatus of the present invention may, if desired, utilize existing ATCRBS interrogator antennas and existing airborne ATCRBS transponder receiving antennas; with the ATCRBS or other communications carrier including a transmitter and antenna providing suitable digital data link characteristics for handling the PWI/CAS/advisory binary message data units. A typical data unit is shown in FIG. 3 and might, for example, be communicated by modulating the transmitted waveform with bits of binary data representing the PWI/CAS/advisory messages in accordance with standard pulse amplitude or frequency modulation techniques.

In the current ATC system, a modified Air Traffic Control Radar Beacon System (ATCRBS), or standard beacon, is an available broadcast digital data link with suitable characteristics for transmission of comprehensive real-time PWI/CAS and basic advisory messages, as proposed in accordance with this invention. For example, the terminal ATCRBS beacon interrogator antenna, with a 360 degree mechanical scan rate of four seconds, operating at 1030 megH with a PRF of between 300 and 400 $H_z$ can accommodate PWI/CAS/advisory messages containing fifty to one hundred bits, with multiple hits during each 3 degree antenna dwell. With existing airborne ATCRBS transponder receivers modified to incorporate a filter and detection channel in the antenna section for discriminating data messages from standard interrogations, sequences of data units processed by this invention can effect the real-time display of information to pilots during the 150 μsec. receive deadtime, which is characteristic of transponders in operation today. Alternatively, available time between modes A and C transmissions on the order of 1000 μsec. due to the difference between the unambiguous (200 mile, 2500-3333 μsec.) and effective (100 mile, 1250-1666 μsec.) ranges of the interrogator could also be used for PWI/CAS/advisory data message transmissions. In this case, a delay of 1000 μsec., for example, set into ATCRBS transponders would easily allow receipt and processing of from four to eight 100-bit PWI/CAS-/advisory display messages prior to down-link replies to standard interrogations. Thus, PWI/CAS/advisory messages would be interleaved in time with other ATCRBS interrogations. Down-link confirmation of PWI/CAS/advisory messages, although not regarded as an essential element of this invention, could if required by ATC doctrine, be transponded by ATCRBS aircraft beacons and received on the ground along with standard replies, and a spare reply code of the existing ATCRBS beacon transmitter could be assigned to this function. Discrete addressing, using the ATCRBS as a data link, is handled in the PWI/CAS/advisory information display logic as will be described in detail hereinafter with reference to FIGS. 2a, b and 4. It is also contemplated that phased-array interrogators may be employed to transmit PWI/CAS/advisory data link message units interleaved in time and space with standard (ATCRBS) beacon interrogations. With phased-array interrogators, data rates up to several thousand messages per second could be provided and the problem of discrete addressing solved by timing and agilely positioning antenna beams to address many aircraft nearly simultaneously, yet individually in range and azimuth, rather than temporally at 4-second intervals and only in azimuth, as with the present terminal ATCRBS system.

It will be noted in FIG. 1 that the present ATC system also allows the controller 13 to insert information into the computer-maintained tracking file by means of a keyboard and track ball positioner unit 14. Such information might include, for example, track initiation, identification, position and altitude data inputs; as well as advisory and command inputs. In this manner, next to radar blips on his display the controller 13 can insert alphanumeric identification and altitude information received by voice radio link. Such data can also be entered into the computer 5 for automatic conflict prediction or to modify computer generated conflict solutions.

In FIGS. 2a and 2b is illustrated a flow chart of the preferred embodiment of the PWI/CAS/advisory information computer program subroutine constituting part of the invention and represented at 8 in FIG. 1. The proposed subroutine instructions can be stored in any general-purpose digital computer, for example, those in the ARTS-III (modified Univac 1230 computers) and NAS-A en route data-processing installations (IBM 9020 A, D, or E computers), and the subroutine occupies approximately 1/1000 of the main core memory of such computers. As will be explained, this subroutine organizes PWI/CAS/advisory information into binary message data units required to actuate the display terminal components in those aircraft whose tracks have been determined to represent a potential collision or otherwise to be in need of correction. As indicated in FIG. 1, the subroutine 8 may also be used to organize information for display at the controller console 6.

Conflict or potential collision status information computed in accordance with the main computer conflict prediction program algorithm enters the proposed subroutine 8 at regular interval, for example once every second or once every two seconds as represented at 17 in FIG. 2a. Potential collision status within computer 5 is thereby tested periodically by the subroutine logic to determine whether a potential collision situation has been computed and, if so, whether it is already being processed by the subroutine; i.e. whether the internal status of the subroutine has previously been set to process the potential collision (see logic unit 18) or whether the particular potential collision situation is new (see logic unit 19). If the internal potential collision status is not set and no new potential collision situation has been computed, the logic recycles to the next status input. If however, a potential collision situation does exist and it is new, the parties to the potential conflict are identified in accordance with the steps specified by the logic group 20 illustrated in FIG. 2b. More specifically, as indicated in FIG. 2b, if the two aircraft have the same level or quality of identification, the first aircraft, i.e. ACFT A, is defined as the one closer to the collision point. If one is better identified than the other, e.g. is reporting 3-D rather than 2-D position, it (the better identified one) is defined as ACFT A. These are arbitrary workable criteria which could, of course, be varied without changing the nature of the identification process or the subroutine.

Following the identification phase, the subroutine logic computes, at 21 in FIG. 2a, time-to-potential collision; from the identity, range, azimuth, altitude, heading and velocity data available within the computer 5 and then tests, at 21a, whether time-to-potential collision has reached a preset value, in this example sixty-eight seconds. When it has, message data units to display aircraft identities are called for and stored by logic units 22 and 23 for eventual output to displays in a manner to be described. Following these displays, and until time-to-potential collision is, in this example, less than thirty-six seconds as detected at 24, message data units to update display of time-to-potential collision, distance apart, and relative positions are called for and stored by logic group 25 illustrated in FIG. 2b.

To provide a more detailed understanding of this process, the main computer conflict prediction program status inputs; e.g. aircraft range, azimuth, altitude, heading, and velocity, are used to compute, at 25a in FIG. 2b, the relative bearing and altitude of the two aircraft involved, together with time and distance-to-potential collision. The subroutine logic units 25b, c, d and e then compare current, or new, computed values of these parameters with presently displayed and stored values, and then store the updated values if appropriate. For example, assume that identification has been established and displayed on two aircraft A and B and the following values are computed at 25a:

| Aircraft B Relative to A | Current or New Computed Values | Presently Displayed (Prior) Values |
|---|---|---|
| Bearing | 48° | 1 o'clock (30°) |
| Altitude | +100 Feet | +100 Feet |
| Time-to-Potential Collision | 52.4 Seconds | 56 Seconds |

-continued

| Aircraft B Relative to A | Current or New Computed Values | Presently Displayed (Prior) Values |
|---|---|---|
| Distance Apart | 6.90 Miles | 7.1 Miles |

Figure 5:
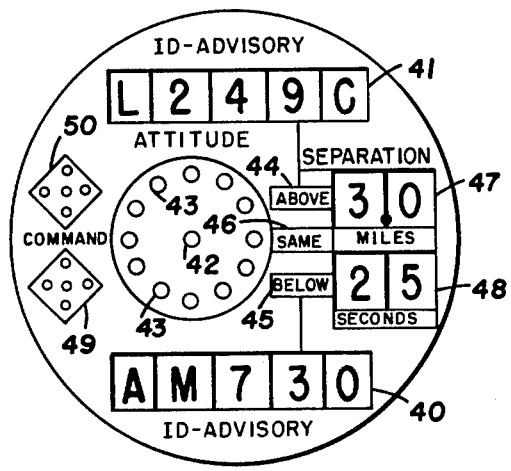
FIG. 5 illustrates the overall design and layout of the preferred embodiment of the face of the proposed PWI/CAS/advisory information terminal display unit.

The specific subroutine logic of the preferred embodiment of this invention would entail: and N(NO) determination, at 25b, of (|48°−30°|>15°) and the storing of two data units to turn off the 1 o'clock bearing light of the aircraft display terminal (see FIG. 5) and turn on the 2 o'clock light; a Y (YES) relative altitude determination, at 25c, of (100 feet <500 feet); and N (NO) time-to-go determination, at 25d, of (|56−52.4 seconds |>0.5 seconds), with 52.4 seconds rounded off to the next lower full second, and the resultant storing of two data units to update the least significant digit of the time-to-potential collision display (see FIG. 5); an N determination, at 25e, of (|7.1−6.90|>0.1) and the storing of four data units to update both digits of the distance display position in FIG. 5; followed by a transfer to logical connector XT, where the data units stored by 25 are output to displays by logic segment 26 (see FIG. 2a); and finally exiting the subroutine and returning to the main computer program for testing the next status inputs. If time-to-potential collision becomes less than thirty-six seconds, as sensed at 24 in FIG. 2a, and an advisory or command message is required by inputs from the main computer program algorithm to resolve the conflict, appropriate numbers of coded message data units for either or both aircraft are specified by logic 27, which stores the units for eventual outputting by logic segment 26 to the ID-ADVISORY portions of the aircraft display terminal in FIG. 5. Additional advisory or command messages may be displayed along with updated time, distance, and relative positions until time-to-potential collision reaches zero seconds, as detected at 28, at which time a message unit for darkening the display or otherwise completing the sequence is stored at 29 for output at 26, and the internal potential collision status is then removed. It should be noted that all data units stored for identification, command, advisory, time and position updates, and darkening the display are the same length and are outputted in precisely the same fashion.

It should also be noted here that by indexing the processing called for in the above-discussed subroutine and by using discretely coded messages, more than one pair of conflicting aircraft can be provided information at the same time. Thus, with the invention embodied in the existing ATC system, a message broadcast to aircrafts A and B could be followed immediately by a message to aircrafts C and D. It is very unlikely that more than two conflicts would be occurring at the same time, even in the busiest terminals. Moreover, the datalink message capacity of the present terminal ATCRBS readily provides for several 50–100 bit messages and multiple hits per dwell so that from one to four conflicting pairs of aircraft could be sent individual or discretely coded PWI/CAS messages during each 4 second scan period. With faster mechanical-scan and phased array antennas under development, or with the airborne cooperative system embodiment of this invention to be discussed later, adequate target handling capacity and data rates would be available to handle the PWI/CAS and automatic ATC advisory services provided by this invention well into the future. Test messages can also be sent at the option of controllers, on request by pilots, or automatically at specified times. As a result, down-link vertification of message receipt is not considered essential.

FIG. 3 illustrates a typical binary coded message data unit that can be called for by the PWI/CAS/advisory information display computer subroutine. In accordance with this invention, one or more such data units are encoded as PWI/CAS/advisory messages for serial transmission to the information display terminal 11 in an aircraft, or over landline to the controller display 12. At such display terminals, the coded bits of the data units are decoded to command the lighting of display components as will be described later in reference to FIGS. 4 and 6 through 12.

The typical data unit consists of nine binary bits; eight of which can convey USASCII-8 (USA Standard Code for Information Interchange) alphanumeric data and the ninth serving as a parity check. Although other standard binary codes such as EBCDIC (extending binary-coded-decimal interchange code) can be used to convey PWI/CAS/advisory messages, modified USASCII-8 is practical as well as illustrative in that it is the code called for by the operational logic of off-the-shelf drivers and incandescent alphanumeric display components that have already proved suitable in a practical embodiment of the cockpit information display terminal portion of this invention. Six bits, numbers 1 through 5 and number 7, allow for computer address of up to sixty-three display positions consisting essentially of individual light sources such as light bulbs or light-emitting diodes, and lighted alphanumeric (A/N) or digital character displays. As mentioned in the explanatory note to FIG. 3, bit 6 turns on an individual light source component so addressed; bit 9 turns off the component; and, bit 8 is a parity check to reduce errors due to spurious bit additions or dropouts. The Penlites Inc. Pland-74 alphanumeric decoder drivers used in such practical application of the cockpit display terminal for displaying letters and numbers utilize Bits 1, 2, 3, 4, 5, and 7 of the illustrated USACII-8 code, which explains the omission of bit 6 from use in the description of the typical data unit in FIG. 3. Bit 8 is used in the drivers for parity and, thus, also in the representative data unit of FIG. 3. If additional error coding is required, the number of data units comprising address messages could be increased; for example, each message could be repeated.

Lights and A/N components addressed and commanded by the computer subroutine logic are actuated individually in series as a real-time response to received message bursts of data units. For components at forty distinct addresses, as assumed in the typical cockpit information display terminal illustrated in FIGS. 4 and 5, a single data unit would be used to operate any individual light and ten data units used to operate five alphanumeric components at a time. Other messages, to actuate combinations of digital components and/or lights would employ from two to ten data units. In addition to addressing and actuating components, the data unit is also coded to enable and to darken the PWI/CAS/advisory information display terminals (see FIG. 3). In order to communicate discretely coded messages to each aircraft requiring PWI/CAS/advisory information, the first two or more data units sent could be devoted to discrete addressing, as will be discussed in detail later.

Figure 4:
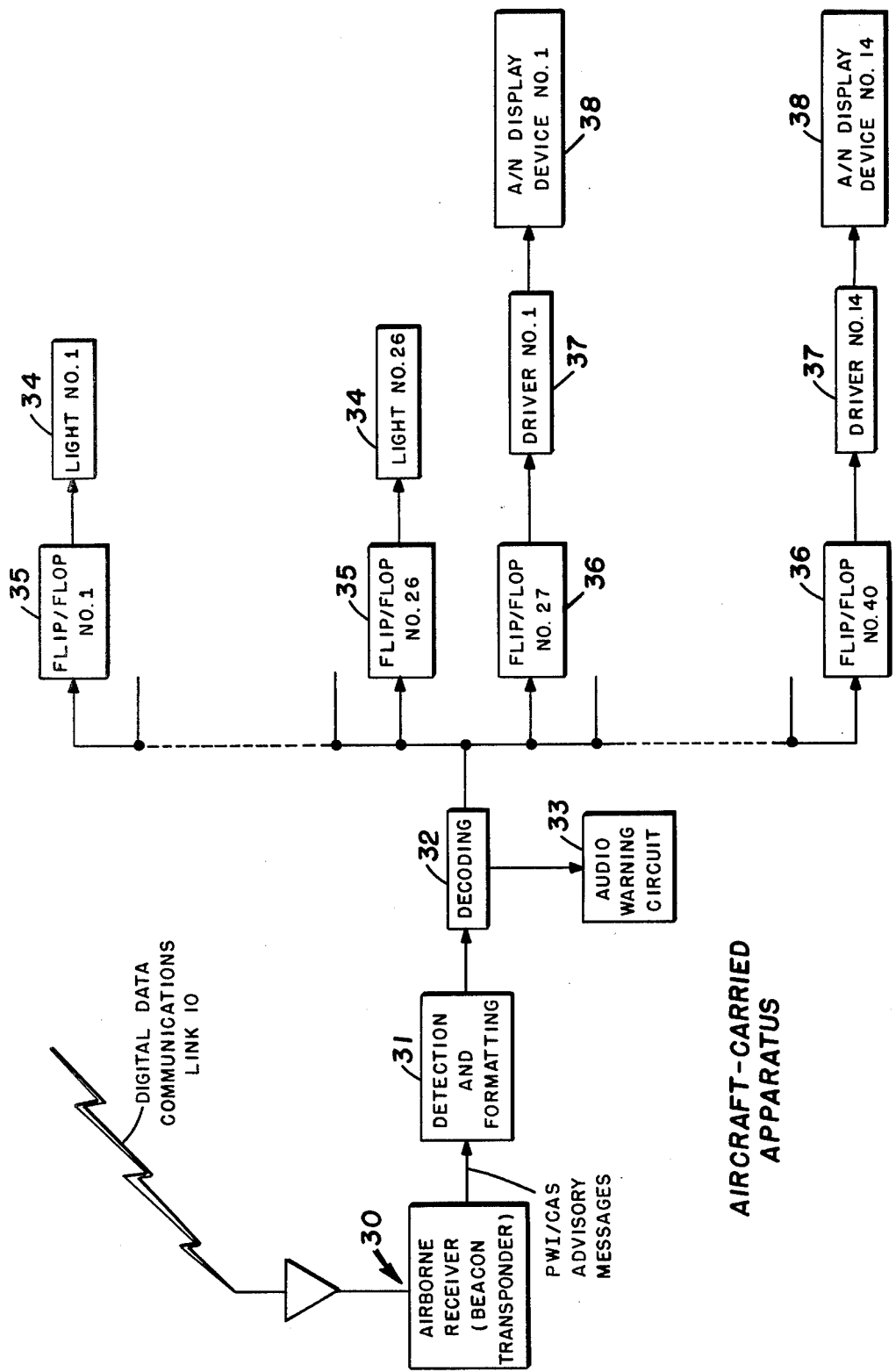
FIG. 4 is a generalized circuit diagram of typical display terminal apparatus whereby the message data units are received, decoded and utilized to actuate the proposed display unit.

FIG. 4 is a circuit diagram of the aircraft-carried apparatus by which the coded binary messages are received at the information display terminal portion of the present invention and effectuate the display of the PWI/CAS/advisory information called for by the computer subroutine logic. Message bursts, consisting of one or more data units, may be received aboard the aircraft by conventional apparatus such as the existing standard aircraft beacon transponder antenna/receiver apparatus 30 carried aboard many aircraft, or they may be generated within an aircraft-carried computer as will be described in relation to the cooperative PWI/CAS arrangement illustrated in FIG. 13. In the ATCRBS case, a simple modification to provide existing aircraft transponder receivers with a channel, e.g. a front-end filter and detector, for separating PWI/CAS/advisory messages from standard coded ATC beacon interrogations would be used; whereas, if either (a) a different VHF, UHF, or beacon receiver is used, or (b) the PWI/CAS messages are generated within a computer in the aircraft based on information received from other aircraft (as in FIG. 13), the display terminal could be designed as part of the airborne receiver. In the first of these cases provision would be made for filtering, detection, and decoding; but the second case would not require signal processing prior to decoding. If ATC doctrine requires a down-link reply to messages, they could be encoded for modulation on and transmission by the airborne beacon transponder transmitter at or near its present down-link carrier frequency (1090 Mhz). This could be accomplished by assigning a surplus existing transponder code to the PWI/CAS/advisory reply, or if a separate down-link frequency were required, an extra channel could be added to the existing transponder transmitter encoder along with an extra oscillator.

Following filtering, detection and formatting, when required, all of which can be accomplished by standard digital methods and circuitry designated at 31 in FIG. 4, the resultant message data unit pulses are decoded at unit 32 which comprises electronic circuits also well-known to those skilled in the art of digital communications. For example, if synchronous pulse duration modulation-demodulation is used, the bit pattern of the incoming pulse train message units could be discriminated and timed by means of a one-shot multivibrator delay circuit. The rest of the decoder circuitry 32 could include, for example, a shift register and standard solid-state switching elements arranged in a logic tree to provide real-time selective addressing and actuation of the light and alphanumeric (A/N) display components. Preferably, a component in the information display terminal remains on following actuation, until subsequently decoded message unit pulses change the component's state.

If desired, the first data unit pulses decoded at the information display terminal might apply a signal to address and actuate a standard audio warning circuit 33, resulting in a short loud buzzing or other auditory sound to alert the pilot that he is to receive further information pertinent to his aircraft. Subsequent data units, as decoded sequentially, would thereafter command individual lights 34 on or off by means of standard solid-state switching circuitry such as flip-flops 35, or they would provide switching, also through the use of flip-flops 36, so that the next suceeding decoded data units apply inputs to off-the-shelf alphanumeric (A/N) character drivers 37 which actuate a plurality of A/N display devices 38. As is well-known, the standard character driver 37 associated with a typical incandescent or light-emitting diode type A/N character display device 38 contains built-in logic that determines which of the possible character states (patterns) is represented by the data unit bit code pulses it receives, and the driver 37 applies current to turn on lighted segments or dots forming display characters thus called for. In the illustrated embodiment of the cockpit terminal display portion of the present invention, it is assumed that there are twenty-six individual lights designated by 34, which can be commercially available miniature lights, light-emitting diodes, liquid crystals, or other bright light sources, reflectors, or phosphors. Similarly, there are fourteen A/N character display devices designated at 38; typically either sixteen segment (alphanumeric) or seven segments (digital) components that are also readily available commercially. In one practical embodiment of the cockpit information display terminal, the alphanumeric components used were 5/16-inch-high Penlites Inc. Model 0-64, 16-segment components which operate on 4 V input and a current of 16.5 milliamperes per segment. They exhibit a typical brightness of 7000 footlamberts and operate in conjunction with the previously noted Pland 74 decoder-drivers. The digital readouts were Penlites Inc. Model 06-40 with similar electrical and optical properties that operate in conjunction with Penlites' DD-20 decoder-drivers. Although these components have proved satisfactory, other incandescent or fluorescent lights or sources using light-emitting or liquid crystal materials should also prove acceptable. Whatever display components are used, extra error correction code circuitry to eliminate bit reversals could, if desired, be provided at critical addresses such as lights used to convey maneuver directions.

As will become more apparent hereinafter, discrete addressing is inherent in this invention in the sense that the cockpit information display terminal 11 enables a pilot to determine, by looking at lighted alphanumeric characters, whether his aircraft is being addressed. Thus, even if message data units representing commands to alphanumeric and light components in the cockpit display terminal are transmitted by general broadcast, without coding to unlock a specific aircraft's terminal and to display his information in a specific place on the face of the terminal, aircraft identification information will be displayed in accordance with the definitions in the computer subroutine (see FIGS. 2a and b, references 20 and 23). Although this would represent the simplest and least expensive way of preparing, transmitting, and displaying the data, it would also lead to needless "alarms", that is, all aircraft in an area would receive PWI/CAS/advisory information and have to visually inspect their display terminals to see what if any information was meant for them. Another possible source of confusion and error to the pilot which is avoided by the present invention is that which would result from varying the position on the display where information regarding his particular aircraft appears.

As a result of these considerations, the preferred embodiment of the proposed cockpit information display terminal includes provisions that cause information applying to one's own aircraft to appear always in a fixed, distinctly colored portion of the display, for example in the lower half of the display face and comprised of green lights; and information relating to "other" aircraft would then always appear in the upper portion (comprised of red lights, for example) of the display. In addition, discrete addressing is preferably employed so that each burst of data units represents a message that is coded so that it can only actuate the cockpit PWI/CAS terminal of one aircraft; i.e. when this invention is combined with the ATC beacon or prospective beacon system, each data message to display an aircraft's identity, show its relative position, or advise or command it, would be preceded by a data message to unlock its PWI/CAS receiver through the well-known use of standard digital logic recognition circuitry.

For example, the first two data units in each discrete address message of this type can be coded to provide 12–14 bits of identification or unlocking code, plus a parity bit and additional bits for error coding. The ensuing data units of the message are coded to actuate display components in the PWI/CAS/advisory terminal so unlocked. Another way to provide discrete addressing is to code the first data units of a PWI/CAS nessage to include up to 14 bits of address information on each aircraft (plus the parity bit) and at least one extra bit to designate the aircraft receiving it as either A or B. These inputs would also be recognized by standard digital logic recognition circuitry and simultaneously provide unlock of the PWI/CAS/advisory information channels in the airborne transponder receivers of both aircraft receiving them. The symmetry of the upper and lower halves of the display terminal face, combined with the bit(s) designating one aircraft as A and the other as B would, with a standard 1's complement register added to the decoder circuitry in each aircraft, enable each decoder to read and display all succeeding data units addressed to it as "own" information that would always appear in the same place in the display, for example in a green color-coded area in the bottom half of the display. Tradeoffs between conservation of message length and added logic circuitry in the decoder of the cockpit display terminal would depend upon message carrier bandwidth characteristics, costs and other penalties associated with cockpit logic circuitry.

Referring now to FIG. 5, the arrangement of addessable light display components and related fixed descriptive information is illustrated as its appears on the face of the preferred embodiment of the proposed cockpit information display terminal portion of the present invention. Up to five alphanumeric (A/N) characters are available, at both 40 and 41, for displaying aircraft identification and advisory information on "own" and "other" aircraft respectively, with character group 40 being green in color and character group 41 being red in color for distinctiveness. For example, identification numbers can consists of five characters for each aircraft corresponding to the last five digits of its serial number, alphanumeric flight number (e.g. L249C, AM730, etc.), or other identification code. Advisory information displayed in the A/N portions 40 and 41 would include approximations of conventional ATC altitude, height, and speed corrections; such as D 050 (down 500 feet), L 020 (left to a heading of 20 degrees) or 145 K (change speed to 145 knots).

The relative clock-bearing positions of the two aircraft are given by an array of lights formed by light 42 that is green, for example, to represent "own" aircraft in the center of a ring of twelve other lights 43 that represent the "other" aircraft and could be red, for example. Relative altitude is also displayed, by three light positions 44, 45 and 46 which could be red and represent respectively whether the "other" aircraft is above, below, or at the same altitude as one's own aircraft. Distance between the two aircraft is shown by a two digit location 47 (yellow, for example) with a decimal point between them, if desired, to show distance in whole miles, half miles, or tenths. Time-to-potential collision is displayed by an adjacent two digit location 48 (also yellow, for example) capable of displaying from 99 to 0 seconds. The display also includes the provision of two 4-way arrows 49 and 50 comprising respectively, for example, five green and five red lights, light pipes, or A/N devices for showing the maneuver direction (up, down, left or right) of command or advisory messages.

FIGS. 6 through 12 of the accompanying drawings illustrate examples of how information would appear on the face of the proposed cockpit information display terminal during a representative pilot warning and collision avoidance display sequence. It should be understood at this time, however, that the display terminal is not limited to any particular size or configuration either by data or hardware considerations. It is regarded as significant, nonetheless, that the illustrated embodiment can provide physical representation of comprehensive and detailed PWI/CAS advisory information in a standard size cockpit instrument, with a face of three and one-quarter inch inside diameter. As noted earlier, the characters and lights represented in FIGS. 5 through 12 are specified as bright green, red, and yellow in the actual display hardware. The addition of color, although not essential, is regarded as valuable in providing immediate, unambiguous differentiation of data, particularly in clearly delineating information relative to one's own aircraft vis-a-vis another aircraft. The typical sequence depicted in FIGS. 6 through 12 is base, for purposes of illustration, on receipt of one or several digital data units every 4 seconds, which is the data rate provided by the existing terminal ATCRBS in the role of PWI/CAS/advisory information data link and, as noted earlier, can thus be considered a practical example of this invention. On the other hand, these drawings represent but one of countless scenarios that can be called for by the flexible computer subroutine portion of this invention.

In order to understand operation of the present invention, assume that a situation develops which, according to the existing and well-known criteria of the current air traffic control (ATC) system, represents a potential collision between two aircraft identified as say, Universal Airlines flight No. 847 (UA 847) and U.S. Air Force flight No. 302 (AF 302); e.g. in accordance with the preselected conflict prediction program algorithm programmed in computer 5 in FIG. 1. Assume further that the ATC system has detected this potential collision situation; that it has been entered, e.g. at 17 in FIG. 2a, into the PWI/CAS/advisory information subroutine, where identification 20 is established (see FIG. 2b); and that through the functioning of logic units 21, 22 and 23 in FIG. 2a as discussed above both of the aircraft involved by now have received, via digital data communications link 10, coded message data units which contain their identities, relative bearings and altitudes and which, following decoding 32, actuate the selected display lights and A/N components.

Figure 6:
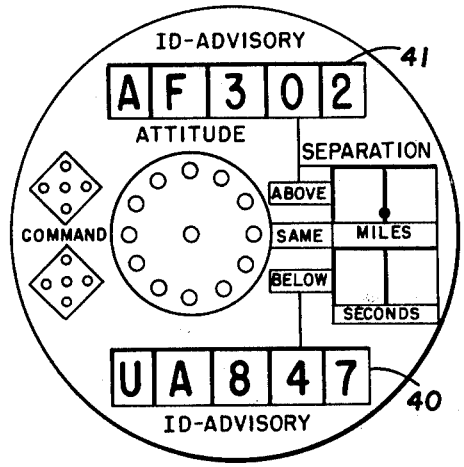

More particularly, in FIG. 6 the first lights to appear on the display in each aircraft in response to the above-discussed subroutine logic is "own" aircrfat's identification, in this case UA 847 in the lower alphanumeric register 40 signifying that it is Universal Airlines flight 847, followed by AF 302 (Air Force flight 302) in the upper register 41 indicating the identity of the other aircraft. As noted earlier, one of the first received data units could also trigger a buzzer circuit 33 in FIG. 4, if desired, to provide each aircraft with an audio alert, as well as the bright visual warning.

Figure 7:
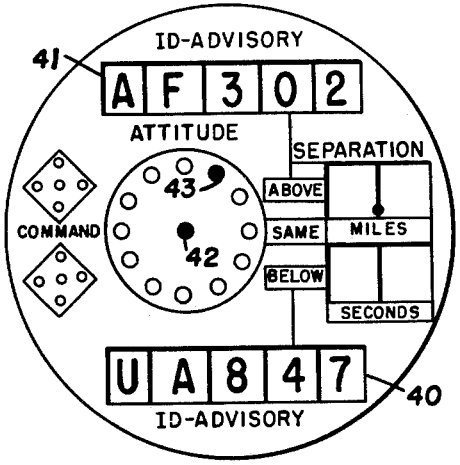

FIG. 7 shows the situation four seconds later when center green light 42, a red light 43 say at 1 o'clock, and a red light 46 reading "SAME" appear on the display. They show respectively, the relative bearing (approx. 30°) of aircraft AF 302 (red light) to aircraft UA 847 (green light) and that aircraft AF 302 is at approximately the same altitude as UA 847. Conversely, at the display terminal in aircraft AF 302, the pilot will see: his identification AF 302 in the lower green section of the display: the identity of UA 847 in the upper red section; the green light in the center and red bearing light at 7 o'clock; and, the "SAME" light will represent his position relative to UA 847.

Figure 8:
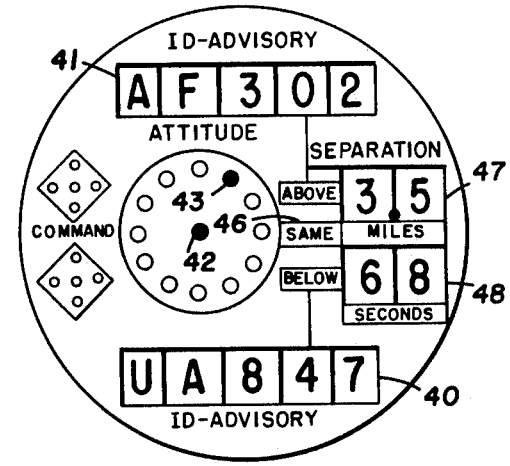

As seen in FIG. 8, the next message carries time-to-potential collision data to display location 48, which in this scenario is in the form of lighted yellow digits indicating sixty-eight seconds in conformance with the computer subroutine illustrated in FIG. 2a, and in particular as computed at 21, selected by logic 21a and stored for display at 25c, and eventually outputted at 26 for transmission to the aircraft. The separation distance between the aircraft is also displayed, at 48, in the same fashion. For the next thirty-two seconds, the countdown continues in response to the computer subroutine logic as noted hereinabove. Thus, computed time, bearing, altitude, and distance updates are transmitted and displayed until (see FIG. 9) at time-to-potential collision minus thirty-six seconds (as determined by subroutine logic 21 and 24) and, say, a two mile separation distance (cited as a possible algorithm condition of the main conflict detection program) a command instruction is called for, at 27, by the main conflict detection program. An advisory message such as turn right to a heading of forty degrees (R 040) and a green arrow command pointing right (also only illustrations of the main computer algorithm) are sent to UA 847 for display at locations 40 and 49 respectively, in response to subroutine logic 26 and 27 in FIG. 2a. Subsequently, as shown in FIG. 10, at time-to-potential collision less 32 seconds (and 1.5 miles separation), the displays of time and separation distance are updated at 48, 47 and the advisory message HOLD would be displayed at 41, via logic 26 and 27, to indicate that AF 302 has been advised to maintain its present speed, direction and altitude. This, coupled with the turn command given to UA 847, causes the relative heading of AF 302 to shift to 12 o'clock as displayed at 42, 43 in FIG. 10.

For the next sixteen seconds, the advisory and command information remain on, and the countdown continues until, as shown in FIG. 11, at time-to-potential collision less sixteen seconds the conflict has been eliminated as illustrated at 47 by the increased separation distance, and the fact that AF 302 is now at 11 o'clock; and UA 847 has been advised, as shown at 40 and 49, that it may now turn left to a heading of twenty degrees. Subsequently, say at time-to-potential collision less eight and four seconds, each aircraft in turn would receive all CLEAR displays via logic 26 and 27, as shown at 40 and 41 in FIG. 12; whereas, at time-to-potential collision less zero seconds, all lights are commanded off in accordance with the computer subroutine logic 28, 29 in FIG. 2a.

As pointed out earlier, the illustrated embodiment of the cockpit information display terminal; the design and operation of which have been described with reference to FIGS. 5 through 12, is but one of many possible configurations of this portion of this invention. Other arrangements and placements of the same or similar components, as well as different numbers of components, could also provide the same kind of dynamic 4-dimensional color-coded position description of one or two aircraft, alphanumeric PWI/CAS/advisory and identification messages, and directional commands without departing from the novel display features described hereinabove. For example, with the ATCRBS as a general broadcast data link, the amount of information conveyed, i.e. numbers of light display components in use, could be expanded somewhat, and with a phased array interrogator operating at L-band or higher frequencies, the number of alphanumeric components could be increased several times. Moreover, greater message capacity could also allow subroutines to resolve conflicts faster than in the example of FIGS. 6 through 12. These possible variations in quantity or rate of information displayed should be regarded as coming within the scope of the present invention, as are diverse forms of pilot warning and collision avoidance information and ATC advisory information services. As noted earlier, these could include four-dimensional position descriptions of threats, their range and range rate, their nature (type, class or individual designation of aircraft or objects), plus advisory and command message displays; all of which permit prompt and effective resolution of existing or impending conflicts between and among aircraft flying in the ATC system. Thus, the pilot can receive advisory information or commands to alter speed, direction, altitude or any combination thereof, and he can be given identification, maneuvers provided, and other information related to the other aircraft involved in a potential collision. Accordingly, the PWI/CAS/advisory method and apparatus of the present invention are highly flexible, lending themselves to expansion (or abbreviation) as the ability of the ATC to acquire and communicate data on aircraft improves or as increased data link capacity makes possible. The invention is also enhanced as position information available in the cockpit from avionics systems is improved, as will become more apparent from the ensuing description of the PWI/CAS/advisory information display method and apparatus embodied as a standalone cooperative airborne PWI/CAS/advisory system.

Referring now to FIG. 13, suitable sources of NAV-AIDS data position in the cockpits of two or more aircraft are represented schematically by blocks 52. Such data include range and bearing with respect to a terminal VOR-DME, or VORTAC, station; compass heading; ground speed; altitude; and/or 3-D position from an inertial reference. These inputs 52 are available with varying degrees of accuracy in all aircraft and with sufficiently verifiable and reliable accuracy in aircraft certified under IFR to meet the operational requirements and existing rules of ATC systems. Moreover, current area navigation aids equipment and navigation instruments are capable of automatically processing real-time digital position data, for cockpit display numerical readouts consisting of incandescent or light emitting diode (LED) components. The coding, decoding and driving circuitry that performs this function operates on standard binary coded decimal logic similar to the A/N and digital components in the cockpit PWI/CAS/advisory information display terminal described hereinabove (see FIG. 4) and in accordance with state-of-the-art principles well-known to those persons familiar with digital circuits. Such digital data processing circuitry is schematically represented in FIG. 13 by the data control unit 53 which may form part of or be associated with an airborne area or other navigation system and operates on data from the illustrated programmed general-purpose digital computer 54; i.e. the control unit 53 codes PWI/CAS/position data message units prior to their transmission to the cooperating aircraft and may perform the same function for sending the same or similar messages to a cockpit display 55. The control unit 53 also processes position data message units received from other aircraft (in addition to position data generated onboard), inputs these data units to the main conflict prediction program within computer 54, and outputs the units stored by the PWI/CAS/advisory information subroutine, as previously described, to the aircraft-carried display apparatus comprising the proposed PWI/CAS/advisory display unit 55. In accordance with the embodiment of the present invention being described, position data also can be entered manually, or part manually and part automatically, through the data control unit 53, by means of a keyboard, vocoder or other standard equipment 57 used for digitizing numerical data, under the control of the pilot or navigator of an aircraft.

"Own" position data entered in the data control unit 53 of an aircraft are applied at 58 as coded digital message data unit modulations on a carrier or sub-carrier frequency of any available air-to-air communications transmission capable of serving as a digital data link between any and all aircraft operating within range ovf one another. This would be accomplished by standard digital data communications systems design and modulation practices and existing transmitter-receivers hardware, well known to those skilled in the art of digital data transmission. For example, a VHF frequency currently allocated to commercial aviation communications might be employed, as well as transmitter-receivers currently used in air-to-ground-to-air digital communications systems. One such system provides a data rate of 2400 bits a second and can handle messages to and from fifty to sixty aircraft simultaneously in the en route ATC environment, with each aircraft being polled on a single frequency about twice a minute. Digital messages up to 220 characters (1200 bits) long are exchanged between an aircraft and a ground station in about one-half second. The poll can be speeded up, and messages shortened to approximately 400 bits a second, for a ground station to communicate with about six aircraft every two seconds. The necessary polling messages from the ground to initiate and synchronize cooperative position PWI/CAS exchange herein described relative to FIG. 13 could also be supplied by beacon interrogators or any other ATC area timing signals, and is generally designated at reference 59.

In accordance with this second embodiment of the present invention, digital position data units are communicated from one aircraft to another, e.g. from aircraft A to aircraft B, at regular intervals such as once each second or every two seconds. At aircraft B, such data are demodulated, detected and formatted for decoding in the receiver section 58, in accordance with state-of-the-art digital communications circuit techniques similar to those discussed earlier with reference to FIG. 4. Thereupon, the position data are decoded in the control unit 53 and transferred to the memory of the digital computer 54 aboard aircraft B where they are compared with data regarding aircraft B's own position which have been automatically entered into the computer 54 also at regular (1 or 2 second) intervals and temporarily stored in another memory location. A potential collision situation between the two aircraft, based on time-to-potential collision or other separation criteria, is determined by the main conflict prediction algorithm set or wired into each aircraft's digital computer 54, such algorithms being of any desired form well-known to those skilled in the art of air traffic control (ATC). The resultant collision status information is entered into the PWI/CAS/advisory computer subroutine portion of this invention, as described hereinabove in relation to FIG. 2a of this disclosure, and used to generate the message data unit sequences that specify the proper display state of components in the PWI/CAS/advisory information display terminal 55 of aircraft B. Simultaneously, the reverse display process culminates in a display sequence at the PWI/CAS/advisory information display terminal 55 of the "other" aircraft, i.e. aircraft A in FIG. 13.

If only one of the two aircraft involved, e.g. aircraft A, is equipped with a digital computer 54 programmed with conflict prediction algorithm and PWI/CAS/advisory information subroutine, then that computer, algorithm, and subroutine could formulate display messages for both aircraft and cause aircraft B's messages to be encoded and transmitted to aircraft B over the same digital data link that otherwise would transmit aircraft A's position. Alternatively, aircraft B might receive PWI/CAS/advisory messages from a ground or other central communications computer while aircraft A makes its own PWI/CAS computations and composes its own display messages. These and other modified uses of the present invention can be accommodated by including priority bit coding in the PWI/CAS/advisory identification messages discussed previously in relation to FIG. 4. Such coding would establish rules for displaying a message originated in the aircraft-carried computer 54 vis-a-vis one originated in a ground or other central communications computer.

It should be noted that from the computer point of view, conflict prediction is simplified by the airborne location of the PWI/CAS computers. For example, initiation of a display sequence in the air-to-air cooperative system, theoretically at least, will always be based on 3-D position information; thus simplifying conflict algorithms and reducing computer work load; and availability of additional NAVAIDS inputs, e.g. continuous indication of flight angle variations from horizontal and pilot intended course alterations, offer potential advantages of system accuracy and reliability.

Various other modifications, adaptations and alterations are of course possible in light of the above teachings. It should therefore be understood that within the scope of the appended claims the invention may be practiced otherwise than as was specifically described.

What is claimed is:

1. In an air traffic control system including programmable computer means which registers the identity and position of aircraft within a predetermined control area and which is programmed according to a preselected conflict prediction algorithm effective to detect potential collision situations involving aircraft within said control area, the improvement comprising:
 a program subroutine means within said computer means and having entered therein data identifying each detected potential collision situation involving aircraft within said control area for establishing a control sequence according to which each aircraft involved in said potential collision situation is to have communicated to it information regarding
   (a) the relative position of the other aircraft or object involved in said potential collision situation, and
   (b) what action should be taken to avoid said potential collision,
 communication means responsive to the control sequence established by said subroutine means for communicating said information to each aircraft involved in said potential collision situation, and
 display terminal means in each of said aircraft operably connected to said communication means for displaying the information communicated by said communication means.

2. The improved air traffic control system specified in claim 1 wherein the information communicated to each aircraft for display includes message data unit means containing the identity of that aircraft.

3. The improved air traffic control system specified in claim 2 wherein the information communicated to each aircraft for display further includes,
 message data unit means containing the identity of the other aircraft involved in said potential collision situation, and
 message data unit means indicative of time and distance to potential collision.

4. The improved air traffic control system specified in claim 3 wherein said program subroutine means includes,
 first logic unit means for defining a reference series of decreasing times to potential collision, and
 second logic unit means responsive to the time reference series defined by said first logic unit means for sequentially actuating said communication means to communicate, in succession,
   (a) the identities of the aircraft involved,
   (b) their relative positions,
   (c) the time and distance to potential collision, and
   (d) a command, if any is required, to enable the aircraft to avoid the potential collision.

5. The improved air traffic control system specified in claim 4 wherein said program subroutine means further includes third logic unit means for defining an identification priority between two aircraft involved in the potential collision situation and wherein said second logic unit means actuate said communication means to communicate in succession the required command for each of said two aircraft in accordance with the identification priority defined by said third logic unit means.

6. The improved air traffic control system specified in claim 4 wherein said second logic unit means includes means for actuating said communication means to periodically up-date at said display terminal means the time and distance to potential collision and the relative positions of the aircraft involved in said potential collision.

7. The improved air traffic control system specified in claim 6 wherein said first logic unit means comprises means for demarcating the occurrence of a sequence of decreasing reference times to the predicted collision time and said second logic unit means comprises:
 means responsive to said reference time demarcating means for actuating said communication means upon the occurrence of a first reference time to communicate to each aircraft the identities of aircraft involved in the potential collision, means responsive to said reference time demarcating means for actuating said communication means during the interval between said first reference time and a second subsequent reference time to communicate periodically updated relative position and time and distance to potential collision data to each aircraft, means responsive to said reference time demarcating means for actuating said communication means upon the occurrence of said second reference time to communicate required command information to each aircraft advising each aircraft of what maneuver to take to avoid the potential collision, means responsive to said reference time demarcating means for actuating said communication means during the interval between said second reference time and a third subsequent reference time to resume communicating updated time and distance to potential collision and relative position data to each aircraft.

8. The improved air traffic control system specified in claim 7 wherein said second logic unit means further comprises means responsive to said reference time demarcating means for actuating said communication means upon the occurrence of said third reference time to communicate a control signal to each of said aircraft effective to disable the display terminal means in each aircraft, said third reference time being equal to the predicted time of collision.

9. The improved air traffic control system specified in claim 1 wherein,
said display terminal means comprises a plurality of digital code actuated display component means, and
said communication means comprises a digital data link including means for transmitting coded multi-bit message data units to each aircraft and means on each aircraft for receiving said transmitted data units and decoding them to selectively actuate the display components.

10. The improved air traffic control system specified in claim 1 wherein said display terminal means in each aircraft comprises a display face constituted of a plurality of distinctly located, discrete groups of display components for displaying discrete types of information.

11. The improved air traffic control system specified in claim 10 wherein,
a first group of alphanumeric components displays the identity of the aircraft carrying said display terminal,
a second group of alphanumeric components displays the identity of the other aircraft or object involved in said potential collision situation,
a third group of components displays relative bearing,
a fourth group of components displays relative altitude,
a fifth group of components displays time to potential collision, and
a sixth group of components displays distance to potential collision.

12. The improved air traffic control system specified in claim 11 wherein said first and second groups of components additionally display respectively the commands enabling the two aircraft involved to avoid the collision.

13. The improved air traffic control system specified in claim 11 wherein said first and second groups of components contain color-coded alphanumeric characters to help distinguish between the information displayed by said first and second groups of components.

14. The improved air traffic control system specified in claim 1 further including display terminal means at a controller station operably connected to receive and display the information communicated to each aircraft and data input means interconnecting said controller station to the programmable computer means to permit a controller to insert manually selected data inputs into said computer means.

15. The improved air traffic control system specified in claim 1 wherein said programmable computer means is located in at least one of a plurality of cooperating aircraft and said communication means is in part located in each aircraft to provide communication therebetween.

16. The improved air traffic control system specified in claim 1 wherein said program subroutine means includes,
first logic means for establishing an identification priority between each pair of aircraft involved in a potential collision,
second logic means responsive to the identification priority established by said first logic means for defining a reference control series of decreasing times to potential collision,
third logic means responsive to the identification priority established by said first logic means and to the time reference series defined by said second logic means for determining the relative bearings and altitudes of the aircraft involved, and the distance between said aircraft, and fourth logic means responsive to said first, second, and third logic means for determining whether command or advisory information messages should be sent to said aircraft, and including means for defining the timing and for specifying the content of such messages, whereby said logic means provides sequential message formulation and actuation of said communications means to communicate, in succession,
(a) the identities of the aircraft involved
(b) the relative bearings and altitudes of the aircraft involved,
(c) the time to potential collision,
(d) the distance between the aircraft, and
(e) command or advisory information as required to enable the aircraft to avoid the potential collision.

17. The improved air traffic control system specified in claim 16 wherein said second logic means comprises means for demarcating the occurrence of a sequence of decreasing reference times relative to the predicted collision time and wherein said fourth logic means comprises:
means responsive to said reference time demarcating means for actuating said communication means upon the occurrence of a first reference time to communicate to each aircraft the identities of aircraft involved in the potential collision;
means responsive to said reference time demarcating means for actuating said communication means during the interval between said first reference time and a second subsequent reference time to communicate to each aircraft periodically updated relative bearing and altitude, and updated time and distance to potential collision; and
means responsive to said reference time demarcating means for actuating said communication means during the interval between said second reference time and a third subsequent reference time to communicate specified command and advisory information to each aircraft advising each aircraft of what maneuver to take to avoid potential collision.

* * * * *